United States Patent [19]
Story et al.

[11] 3,787,014
[45] Jan. 22, 1974

[54] REPLACEMENT MOTOR MOUNTING

[76] Inventors: Robert S. Story, 1419 Oak Vista, Dallas; Arvind S. Patel, 818 Dorian Way, Grand Prairie, both of Tex.

[22] Filed: Apr. 30, 1973

[21] Appl. No.: 355,453

Related U.S. Application Data

[63] Continuation of Ser. No. 154,421, June 18, 1971, abandoned.

[52] U.S. Cl. .................................. 248/14, 310/91
[51] Int. Cl. ............................................ H02k 5/04
[58] Field of Search ........ 248/2, 14, 16, 15; 310/91, 310/51

[56] References Cited
UNITED STATES PATENTS

| | | | |
|---|---|---|---|
| 1,822,342 | 9/1931 | Ehrlich | 310/91 |
| 1,888,476 | 11/1932 | Scott | 248/17 X |
| 2,640,367 | 6/1953 | Rieser | 248/16 X |
| 2,683,006 | 7/1954 | Nichols | 248/2 |
| 2,976,745 | 3/1961 | Bade | 248/16 X |
| 3,432,705 | 3/1969 | Lindtvert | 248/16 X |

*Primary Examiner*—J. Franklin Foss

[57] ABSTRACT

A replacement motor mounting includes an adapter plate comprising a circular central portion and four arms which extend radially outwardly from the central portion. A first set of fastener receiving holes is formed in the central portion in the pattern of the fastener receiving holes of a mounting structure designed to support an original equipment motor. Two second sets of fastener receiving holes are formed in the arms in the patterns of the fastener receiving holes of two types of replacement motors. The central portion is displaced axially from the arms to admit air to a replacement motor supported on the adapter bracket.

8 Claims, 5 Drawing Figures

PATENTED JAN 22 1974 3,787,014

INVENTORS
ROBERT S. STORY
ARVIND S. PATEL

Richards, Harris & Hubbard
ATTORNEY

INVENTORS
ROBERT S. STORY
ARVIND S. PATEL

Richards, Harris & Hubbard
ATTORNEY

REPLACEMENT MOTOR MOUNTING

This is a continuation of application Ser. No. 154,421, filed June 18, 1971, now abandoned.

BACKGROUND AND SUMMARY OF THE INVENTION

This invention relates to a replacement motor mounting, and more particularly to an adapter plate for securing a replacement motor on a motor mounting structure designed to support an original equipment motor.

As is well known to the service industry, air conditioning units and other major appliances often employ a new type of motor commonly referred to as an inside-out motor which at the present time are manufactured only by Delco Products Division of General Motors Corp. which differs from conventional motors in at least two significant respects. First, the inside-out type motor has a rotating outer housing. Second, the fastener receiving holes which are employed in supporting the inside-out motor are spaced about a relatively small diameter circle around the axis of the motor.

Because of the foregoing differences between the inside-out type motor and conventional motors suitable for use in servicing air conditioning systems, it has heretofore been necessary to use an inside-out motor when servicing an air conditioning system incorporating such a motor. This is disadvantageous because the inside-out type motor is not available to the service industry through normal channels, but instead must be purchased at "retail." For this reason, the cost to the service industry of an inside-out type motor is substantially greater than the cost of a conventional replacement motor.

The present invention relates to a replacement motor mounting whereby a conventional replacement motor can be installed as a replacement for the inside-out type motor. In accordance with the preferred embodiment of the invention, an adapter plate comprises a unitary body of sheet metal having a first set of fastener receiving holes formed through it in a pattern corresponding to the pattern of the fastener receiving holes of an inside-out type motor and having a second set of fastener receiving holes formed through it in accordance with the pattern of the fastener receiving holes of a replacement motor. The first set of fastener receiving holes is formed in a generally circular central portion of the adapter plate and the second set of fastener receiving holes is formed in a plurality of arms which extend radially outwardly from the central portion. The central portion of the adapter plate is preferably displaced axially from the arms to permit air flow to the replacement motor.

More particularly, the adapter plate is provided with at least two second sets of fastener receiving holes, one arranged in the pattern of the fastener receiving holes of conventional replacement motors such as those manufacturd by General Electric Company and Emerson. In the use of the invention the adapter plate is secured to a replacement motor by means of fasteners positioned in the appropriate second set of fastener receiving holes. Similarly, the adapter plate is secured to the mounting structure that originally supported the inside-out type motor by means of fasteners positioned in the first set of fastener receiving holes. In this manner the replacement motor is installed in place of the inside-out type motor.

DESCRIPTION OF THE DRAWINGS

A more complete understanding of the invention may be had by referring to the following Detailed Description when taken in conjunction with the accompanying drawings, wherein.

DETAILED DESCRIPTION

Figures 1, 2:
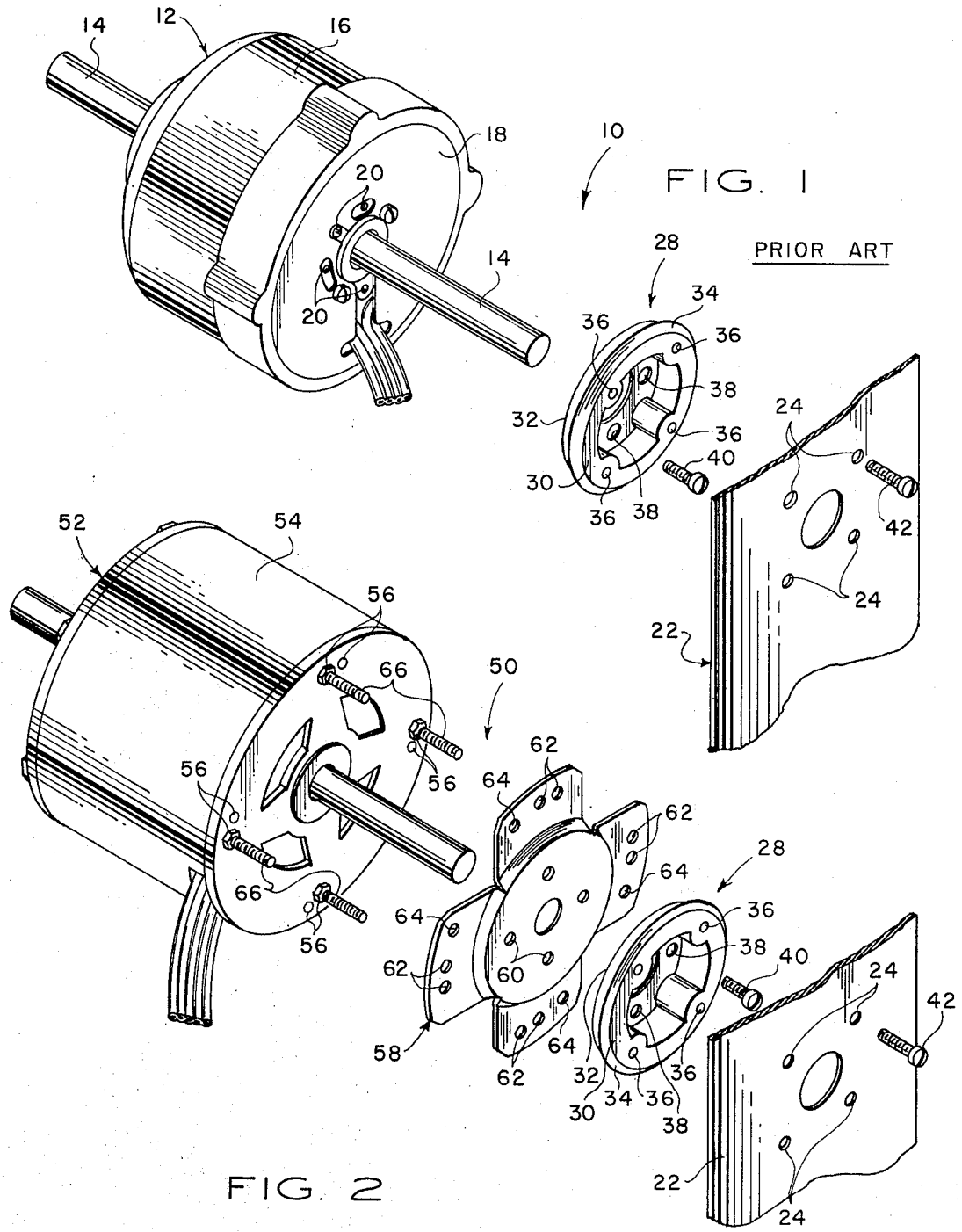
FIG. 1 is an exploded view illustrating a mounting for an original equipment motor.
FIG. 2 is an exploded view illustrating a replacement motor mounting comprising a first embodiment of the invention.

Referring now to the drawings, and particularly to FIG. 1 thereof, there is shown a mounting 10 for an original equipment motor 12. The motor 12 is of the inside-out type employed in air conditioning units sold by major manufacturers. and is somewhat peculiar in design in that it comprises a shaft 14 and an outer housing 16 which rotates with the shaft 14 whenever the motor 12 is energized. The motor 12 further includes a stationary end member 18 having a plurality of fastener receiving holes 20 formed in it. As will be apparent from FIG. 1, the fastener receiving holes 20 of the motor 12 are arranged at spaced points around a relatively small diameter circle which is concentric with the motor 12.

The mounting 10 for the motor 12 includes a bracket 22 which is rigidly secured to the frame of an air conditioning unit. The bracket 22 has a plurality of fastener receiving holes 24 formed through it. In many installations, the mounting 10 further includes a vibration damper 28 comprising a pair of annular metal plates 30 and 32 which are mounted to the opposite sides of a resilient annular ring 34. The plate 30 has a plurality of fastener receiving holes 36 formed in it in the pattern of the fastener receiving holes 24 of the mounting bracket 22 and the plate 32 has a plurality of fastener receiving holes 38 formed in it in the pattern of the fastener receiving holes 20 of the motor 12. Installations of the type shown in FIG. 1 are completed by a plurality of fasteners 40 which are received in the holes 38 and 20 to secure the motor 12 to the vibration damper 28 and a plurality of fasteners 42 which are received in the holes 24 and 36 to secure the vibration damper 28 to the mounting bracket 22.

As those familiar with the service industry will appreciate, certain inside-out type air conditioning unit motor installations differ from that illustrated in FIG. 1 in that the vibration damper 28 is eliminated. In the latter type of installation, the fastener receiving holes 24 of the mounting bracket 22 are arranged in the pattern of the fastener receiving holes 20 of the motor 12, and the fasteners 42 are received in the holes 24 and the holes 20 to secure the motor 12 directly to the mounting bracket 22.

Referring now to FIG. 2, there is shown a replacement motor mounting 50 comprising a first embodiment of the present invention. In the practice of the invention, the mounting 50 is utilized to install a conventional replacement motor 52 in an air conditioning unit having an inside-out type motor as a replacement for the original equipment motor of the unit. The replacement motor 52 differs from the original equipment motors employed in inside-out type air conditioning units in that it comprises a stationary outer housing 54. More importantly, the motor 52 differs from inside-out type original equipment motors in that it has a plurality of fastener receiving holes 56 formed in it at spaced points around a relatively large diameter circle that is concentric with the motor 52.

The replacement motor mounting 50 incorporates the mounting bracket 22 of the air conditioning unit. If the original installation employed a vibration damper 28, it is also utilized in the replacement motor mounting 50. Finally, the replacement motor mounting 50 includes an adapter bracket 58. The bracket 58 preferably comprises a unitary structure and has a first set of fastener receiving holes 60 formed in it in the pattern of the fastener receiving holes of the original equipment motor of the installation, that is, in the pattern of the fastener receiving holes 38 of the vibration damper 28. The bracket 58 also has two second sets of fastener receiving holes 62 and 64 formed in it in patterns corresponding to the patterns of the fastener receiving holes of two different types of replacement motors. The replacement motor mounting 50 is completed by the fasteners 42 of the original installation which are received in the holes 24 and 36 to secure the vibration damper 28 to the mounting bracket 22, the fasteners 40 of the original installation which are received in the holes 38 and 60 to secure the adapter bracket 58 to the vibration damper 28, and by a plurality of fasteners 66 which are received in the fastener receiving holes 56 of the replacement motor 52 and in either the fastener receiving holes 62 or the fastener receiving holes 64 of the bracket 58 to secure the motor 52 to the bracket 58. Of course, if the original installation did not incorporate a vibration damper 28, the fasteners 42 are received in the holes 24 of the mounting bracket 22 and in the first set of fastener receiving holes 60 of the adapter bracket 58 to secure the adapter bracket directly to the mounting bracket.

Referring again to FIG. 1, certain air conditioning units sold by major manufacturers employ an inside-out motor which is substantially identical to the motor 12 except that it is not provided with a shaft 14. Instead, a fan blade (not shown) is bolted directly to the outer housing 16 of the motor. Thus, upon energization of the motor 12, the fan blade rotates with the outer housing 16 relative to the stationary end member 18 of the motor 12. In installations of this type, the motor-fan assembly is usually oriented vertically.

Figure 3:
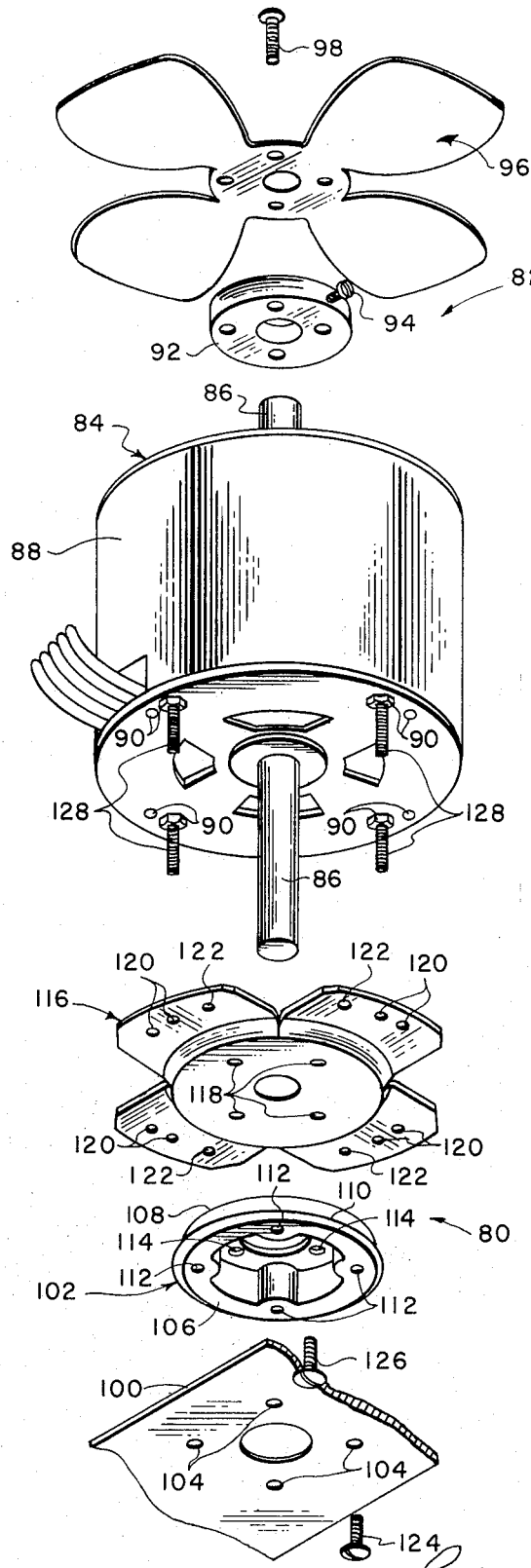
FIG. 3 is an exploded view of a replacement motor mounting comprising a second embodiment of the invention.

Referring now to FIG. 3, there is shown a replacement motor mounting 80 comprising a second embodiment of the invention. In the practice of the invention, the replacement motor mounting 80 is employed to mount a conventional replacement motor-fan assembly 82 in an inside-out type air conditioning unit as a replacement for the original equipment motor-fan assembly of the unit. The motor-fan assembly 82 includes a motor 84 having a shaft 86 which is rotated upon energization of the motor and having a stationary outer housing 88. The motor 84 is also provided with a plurality of fastener receiving holes 90 formed in a relatively large diameter circle around the axis of the motor. The motor-fan assembly 82 further includes a hub 92 which is secured to the shaft 86 of the motor 84 by a set screw 94 and a fan blade 96 which is secured to the hub 92 by a plurality of fasteners 98.

The replacement motor mounting 80 includes a mounting bracket 100 and a vibration damper 102 from the original equipment motor-fan assembly installation. The mounting bracket 100 has a plurality of fastener receiving holes 104 formed in it. The vibration damper 102 is constructed similarly to the vibration damper 28 shown in FIG. 1 in that it comprises a pair of annular metal plates 106 and 108 which are bonded to the opposite sides of a resilient annular ring 110. The plate 106 has a plurality of fastener receiving holes 112 formed in it in the pattern of the fastener receiving holes 104 of the mounting bracket 100, and the ring 108 has a plurality of fastener receiving holes 114 formed in it in the pattern of the fastener receiving holes of the original equipment motor-fan assembly of the air conditioning unit.

Figure 4:
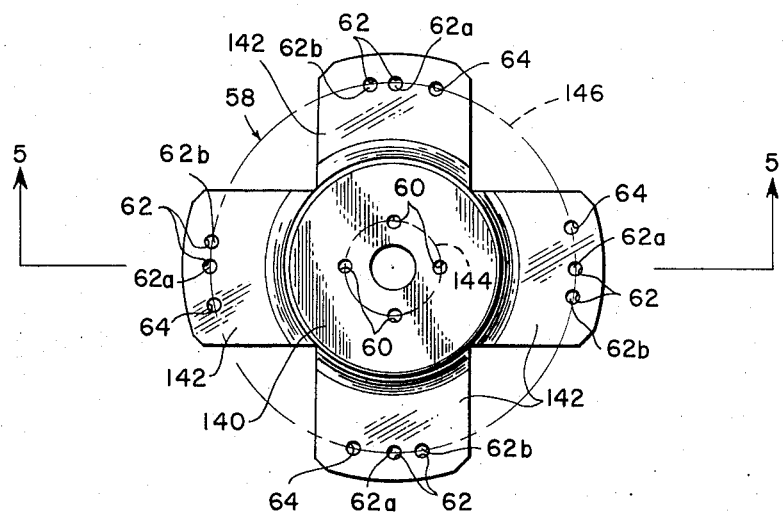
FIG. 4 is a plan view of the adapter plate used in the replacement motor mountings shown in FIGS. 2 and 3.

The replacement motor mounting 80 further includes an adapter bracket 116 which is constructed identically to the bracket 58 illustrated in FIGS. 3 and 4. The bracket 116 has a first set of fastener receiving holes 118 formed in it in the pattern of the fastener receiving holes of the original equipment motor-fan assembly of the air conditioning unit, that is, in the pattern of the fastener receiving holes 114 of the vibration damper 102. The bracket 116 also has two second sets of fastener receiving holes 120 and 122 formed in it in patterns corresponding to the fastener receiving holes of different types of replacement motors. The replacement motor mounting 80 is completed by a plurality of fasteners 124 from the original installation which are received in the holes 104 and 112 to secure the vibration damper 102 to the mounting bracket 100, a plurality of fasteners 126 from the original installation which are received in the holes 114 and 118 to secure the adapter bracket 116 to the vibration damper 102, and a plurality of fasteners 128 which are received in the fastener receiving holes 90 of the motor 84 of the motor-fan assembly 82 and in the holes comprising one of the second sets of fastener receiving holes 120 and 122 of the adapter bracket 116 to secure the motor-fan assembly 82 to the adapter bracket 116. As will be apparent, if the original installation did not include a vibration damper, the fasteners 124 are received in the hole 104 and 118 to secure the adapter bracket 116 directly to the mounting bracket 100.

Figure 5:
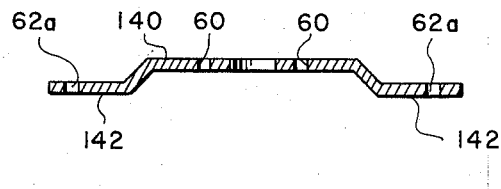
FIG. 5 is a sectional view taken generally along the line 5—5 in FIG. 4 in the direction of the arrows.

Referring now to FIGS. 4 and 5, the adapter bracket 58 (and therefore the adapter bracket 116) comprises a generally circular central portion 140 and four arms 142 that extend radially outwardly from equally spaced points around the periphery of the central portion 140. The holes comprising the first set of fastener receiving holes 60 are formed in the central portion 140 of the bracket 58 and are located at equally spaced intervals around a relatively small diameter circle 144 that is concentric with the central portion 140 of the bracket 58. In accordance with the fastener receiving hole pattern of Sears-Whirlpool type original equipment motors, the circle 144 has a diameter of about 1½ inches.

Each of the second sets of fastener receiving holes 62 and 64 includes at least one hole located in each of the arms 142. The holes comprising the second sets of fastener receiving holes 62 and 64 are located at spaced points around a relatively larger diameter circle 146. In accordance with fastener receiving hole patterns of most replacement motors, the circle 176 has a diameter of about 5⅛ inches.

The holes comprising the second set of fastener receiving holes 62 are arranged in a pattern corresponding to the pattern of the fastener receiving holes of General Electric Company replacement motors and include holes 62a located at 90° increments around the circle 76 and holes 62b located adjacent to but alternately on opposite sides of the holes 62a. On the other hand, the holes comprising the second set of fastener receiving holes 64 are arranged at increments of 120°, 60°, 120°, and 60° around the circle 146. This pattern corresponds to the pattern of the fastener receiving holes of Emerson replacement motors.

As is best shown in FIG. 4, the central portion 140 of the adapter bracket 58 is axially offset from the arms 142. This construction is highly desirable in that it provides a zone for receiving the fasteners that secure the bracket 58 either to a vibration damper or to a mounting bracket. Also, this offset positioning of the central portion 140 relative to the arms 142 together with the notches which are formed in the adapter bracket 58 at the intersections of the arms 142 with the central portion 140 admits air to the central portion of a motor which is mounted on the adapter bracket 58.

In accordance with the preferred embodiment of the invention, the adapter bracket 58 comprises a unitary structure and is fabricated from relatively heavy guage sheet metal by connection stamping techniques. By means of this construction the adapter bracket has sufficient rigidity to maintain the proper alignment of the shaft of a replacement motor notwithstanding the bending movement that is imposed on the bracket by the weight of the motor. As has been indicated, the bracket 116 is identical to the bracket 58. Thus, all of the foregoing description of the bracket 58 is directly applicable to the bracket 116.

From the foregoing, it will be understood that in accordance with the present invention, a replacement motor mounting comprises a motor mounting structure having fastener receiving holes formed in it in the pattern of the fastener receiving holes of an original equipment motor, an adapter bracket having a first set of fastener receiving holes formed in it in the pattern of the fastener receiving holes of the motor mounting structure and having at least two second sets of fastener receiving holes formed through it in patterns corresponding to the fastener receiving holes of different types of replacement motors, a replacement motor having fastener receiving holes formed in it in the pattern of one of the second sets of fastener receiving holes of the adapter bracket and a plurality of fasteners extending through the fastener receiving holes for securing the bracket to the motor mounting structure and for securing the replacement motor to the adapter bracket. The use of the invention is highly advantageous in that it permits the use of conventional replacement motors in Sears-Whirlpool type air conditioning units and thereby greatly reduces the cost of servicing Sears-Whirlpool type air conditioning units.

Although preferred embodiments of the invention have been illustrated in the Drawings and described in the foregoing specification, it will be understood that the invention is not limited to the embodiments disclosed but is capable of rearrangement, modification, and substitution of parts and elements without departing from the spirit of the invention.

What is claimed is:

1. A replacement motor mounting comprising in combination:
    a motor mounting structure having a set of fastener receiving holes formed through it in the pattern of the fastener receiving holes of an inside-out type original equipment motor;
    an adapter bracket having a first set of fastener receiving holes formed through it at spaced points around a relatively small diameter circle and in the pattern of the fastener receiving holes of the mounting structure and having at least two second sets of fastener receiving holes formed through it at spaced points around a relatively large diameter circle and each in the pattern of the fastener receiving holes of a particular type of replacement motor;
    said bracket comprising a unitary body of sheet metal including a circular central portion having the first set of fastener receiving holes formed through it and four arms extending radially outwardly from substantially equally spaced points about the central portion and each having at least one hole of each of the two second sets of fastener receiving holes formed through it;
    said central portion of the adapter bracket being axially displaced from the arms for admitting cooling air to the replacement motor;
    a replacement motor having fastener receiving holes formed in it in the pattern of one of the second sets of fastener receiving holes of the adapter bracket;
    a first plurality of fasteners extending through the fastener receiving holes of the motor mounting structure and through the first set of fastener receiving holes of the adapter bracket for securing the adapter bracket to the motor mounting structure; and
    a second plurality of fasteners extending through the fastener receiving holes of the replacement motor and through the holes comprising said one of the second sets of fastener receiving holes in the adapter bracket for securing the replacement motor to the adapter bracket.

2. For use in a replacement motor mounting, an adapter bracket comprising a generally circular central portion and a plurality of arms extending radially outwardly from spaced points around the periphery of the central portion, said central portion having a first set of fastener receiving holes formed therethrough in the pattern of the fastener receiving holes of an inside-out type original equipment motor and said arms having at least two second sets of fastener receiving holes formed therethrough in the patterns of the fastener receiving holes of at least two type of replacement motors, the central portion and the arms of the adapter bracket comprising a unitary body of sheet metal formed to axially displace the central portion from the arms to permit air flow to the portion of a replacement motor adjacent the central portion of the adapter bracket.

3. The adapter bracket according to claim 2 wherein the holes comprising the first set of fastener receiving holes are located at spaced points around a first relatively small diameter circle which is concentric with the central portion, wherein the holes comprising the two second sets of fastener receiving holes are located at spaced points around a second relatively large diameter circle which is concentric with the first circle and with the central portion, and wherein each of the second sets of fastener receiving holes comprises at least one hole formed in each of the arms.

4. The adapter bracket according to claim 3 wherein the first circle has a diameter of about 1½ inches and wherein the second circle has a diameter of about 5⅛ inches.

5. The adapter bracket according to claim 4 wherein the holes comprising one of the second sets of fastener receiving holes are eight in number and include four holes located at equally spaced points around the second circle and four holes located adjacent to and alternatively on opposite sides of the four equally spaced holes and wherein the holes comprising the other of the second sets of fastener receiving holes are four in number and are located at points on the second circle separated by angles of 120°, 60°, 120° and 60°.

6. A replacement motor mounting comprising in combination:
a motor mounting structure having a set of fastener receiving holes formed through it in the pattern of the fastener receiving holes of an inside-out type original equipment motor;
an adapter bracket having a first set of fastener receiving holes formed through it at spaced points around a relatively small diameter circle and in the pattern of the fastener receiving holes of the mounting structure and having at least two second sets of fastener receiving holes formed through it at spaced points around a relatively large diameter circle and each in the pattern of the fastener receiving holes of a particular type of replacement motor;
said bracket comprising a unitary body of sheet metal including a circular central portion having the first set of fastener receiving holes formed through it and four portions extending radially outwardly from substantially equally spaced points about the central portion and each having at least one hole of each of the two second sets of fastener receiving holes formed through it;
said central portion of the adapter bracket being axially displaced from the outer portions to facilitate connection of the central portion to the motor mounting structure and to facilitate connection of the replacement motor to the outer portions;
a replacement motor having fastener receiving holes formed in it in the pattern of one of the second sets of fastener receiving holes of the adapter bracket;
a first plurality of fasteners extending through the fastener receiving holes of the motor mounting structure and through the first set of fastener receiving holes of the adapter bracket for securing the adapter bracket to the motor mounting structure; and
a second plurality of fasteners extending through the fastener receiving holes of the replacement motor and through the holes comprising said one of the second sets of fastener receiving holes in the adapter bracket for securing the replacement motor to the adapter bracket.

7. For use in a replacement motor mounting, an adapter bracket comprising a generally circular central portion and a plurality of portions extending radially outwardly from spaced points around the periphery of the central portion, said central portion having a first set of fastener receiving holes formed therethrough in the pattern of the fastener receiving holes of an inside-out type original equipment motor and said outer portions having at least two second sets of fastener receiving holes formed therethrough in the patterns of the fastener receiving holes of at least two types of replacement motors, the central portion and the outer portions of the adapter bracket comprising a unitary body of sheet metal formed to axially displace the central portion from the outer portions to facilitate mounting of the adapter bracket on structure that previously mounted an inside-out type original equipment motor and mounting of a replacement on the adapter bracket.

8. As a replacement for an inside-out type original equipment motor, the combination of:
an adapter bracket comprising a central portion having a first set of fastener receiving holes formed therethrough in the pattern of the fastener receiving holes of the inside-out type original equipment motor and four portions extending radially outwardly from the central portion and having at least two sets of fastener receiving holes formed therethrough in the patterns of the fastener receiving holes of at least two types of replacement motors, the central portion and the outer portions comprising a unitary body of sheet metal formed to axially displace the central portion from the outer portions, thereby facilitating connection of the central portion to structure that previously supported the inside-out type original equipment motor and connection of the outer portions to a replacement motor; and
a replacement motor having fastener receiving holes formed therein in the pattern of one of the sets of fastener receiving holes in the outer portions of the adapter bracket.

* * * * *